United States Patent
Pham et al.

(10) Patent No.: US 9,914,549 B2
(45) Date of Patent: Mar. 13, 2018

(54) METHOD, SYSTEM AND APPARATUS FOR ASSEMBLING A COMPOSITE WING SKIN WITH STIFFENERS

(71) Applicant: The Boeing Company, Chicago, IL (US)

(72) Inventors: Doan Dinh Pham, Lacey, WA (US); Mark Charles Iden, Burien, WA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 14/629,131

(22) Filed: Feb. 23, 2015

(65) Prior Publication Data
US 2016/0244185 A1 Aug. 25, 2016

(51) Int. Cl.
*B25B 5/00* (2006.01)
*B64F 5/10* (2017.01)
*B25B 5/06* (2006.01)
*B29C 65/00* (2006.01)

(52) U.S. Cl.
CPC ................ *B64F 5/10* (2017.01); *B25B 5/003* (2013.01); *B25B 5/06* (2013.01); *B29C 66/82661* (2013.01); *Y02P 70/585* (2015.11)

(58) Field of Classification Search
CPC .... B29C 65/7841; Y10S 425/029; B64F 5/10; B25B 5/003; B25B 5/087; B25B 1/02; B25B 3/00; B25B 7/00; B25B 5/06
USPC ................ 269/43, 44, 86–286, 45, 32, 63
See application file for complete search history.

(56) References Cited

U.S. PATENT DOCUMENTS

| | | | |
|---|---|---|---|
| 4,995,146 A | 2/1991 | Woods | |
| 7,891,618 B2 * | 2/2011 | Carnevali | A47B 21/0314 248/228.5 |
| 8,181,949 B2 * | 5/2012 | Hung | B25B 1/103 269/244 |
| 2007/0089475 A1 | 4/2007 | Kim | |

(Continued)

FOREIGN PATENT DOCUMENTS

| | | |
|---|---|---|
| CN | 203062651 U | 7/2013 |
| CN | 204725061 U | 10/2015 |

OTHER PUBLICATIONS

English Translation of Abstract of Chinese Patent No. 203062651 dated Sep. 28, 2016.

(Continued)

*Primary Examiner* — Scott W Dodds
(74) *Attorney, Agent, or Firm* — McDonnell Boehnen Hulbert & Berghoff LLP (57) ABSTRACT

A jig apparatus and associated systems and methods for forming a composite wing skin is presented, including providing a frame with a working surface. A plurality of indexing blocks are coupled to the working surface of the frame. Each of the plurality of indexing blocks has a first indexing surface oriented perpendicular to the working surface of the frame and a second indexing surface oriented approximately parallel to the working surface of the frame. A plurality of clamping blocks are also each moveably coupled to one of the plurality of indexing blocks. Each of the plurality of clamping blocks has a clamping surface oriented perpendicular to the working surface of the frame and in facing relation to the first indexing surface of an adjacent indexing block thereby defining a plurality of channels.

20 Claims, 10 Drawing Sheets

(56) References Cited

U.S. PATENT DOCUMENTS

2009/0317587 A1  12/2009  Deobald et al.
2010/0154990 A1   6/2010  Brennan et al.
2013/0309443 A1  11/2013  Deobald et al.

OTHER PUBLICATIONS

English Translation of Abstract of Chinese Patent No. 204725061 dated Sep. 28, 2016.
Intellectual Property Office Examination & Search report issued in GB Application No. 1602830.9 dated Aug. 19, 2016.

* cited by examiner

METHOD, SYSTEM AND APPARATUS FOR ASSEMBLING A COMPOSITE WING SKIN WITH STIFFENERS

TECHNICAL FIELD

This disclosure generally relates to jig apparatus, assembly systems and methods for forming a composite wing skin, particularly using stiffeners and a bag treatment.

BACKGROUND

Formed composite parts called stiffeners, for example a ply-by-ply airplane wing stringer, are commonly used in applications, such as aircraft and vehicles, where lightweight and high strength are desired. Locating and placing these composite parts on a composite wing skin has traditionally been done manually, requiring workers to climb on top of the wing skin. This may result in damage to the wing skin and is not ergonomically desirable. This process is also time consuming and may require up to 40 man hours depending on the specific application.

Accordingly, there is a need for a jig apparatus and improved assembly systems and methods for forming composite wing skins that avoids or minimizes manual processes of prior known methods.

SUMMARY

The disclosed embodiments provide jig apparatus, systems and methods for forming a composite wing skin utilizing stiffeners.

In a first aspect, a jig apparatus is provided including a frame with a working surface. A plurality of indexing blocks are coupled to the working surface of the frame. Each of the plurality of indexing blocks has a first indexing surface oriented perpendicular to the working surface of the frame and a second indexing surface oriented approximately parallel to the working surface of the frame. A plurality of clamping blocks are also each moveably coupled to one of the plurality of indexing blocks. Each of the plurality of clamping blocks has a clamping surface oriented perpendicular to the working surface of the frame and in facing relation to the first indexing surface of an adjacent indexing block thereby defining a plurality of channels.

A second aspect is directed to an assembly system for forming a composite wing skin that includes a jig apparatus according to the first aspect. A platform is part of the system and is moveable between a first end of the jig apparatus and a second end of the jig apparatus. This system further includes a bag treatment that is coupled to at least the first end of the jig apparatus such that the bag treatment lies adjacent to one or more of the second indexing surfaces of the plurality of indexing blocks. A cavitation tool is also included in the system and has a protrusion configured to be received within each of the plurality of channels of the jig apparatus.

A third aspect is also disclosed for a method for forming a composite wing skin that includes providing a jig apparatus according the first aspect of the disclosure. The jig apparatus includes a first indexing block of the plurality of indexing blocks and a first clamping block of the plurality of clamping blocks that are arranged at a first end of the jig apparatus and define a first channel. A bag treatment is coupled to at least the first end of the jig apparatus such that the bag treatment lies adjacent to one or more of the second indexing surfaces of the plurality of indexing blocks. Next, a protrusion of a cavitation tool is pressed against the bag treatment and into the first channel and then is removed from the first channel such that the bag treatment remains in the first channel. And an extension portion of a first stiffener is then pressed into the first channel. The first clamping block is then moved from an open position to a clamped position thereby locking the first stiffener in place in the first channel.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

A first step common to the methods and systems described in connection with various embodiments of the disclosure described herein involves providing a suitable jig apparatus to assemble a bag treatment with stiffeners for a composite wing skin.

Figure 1:
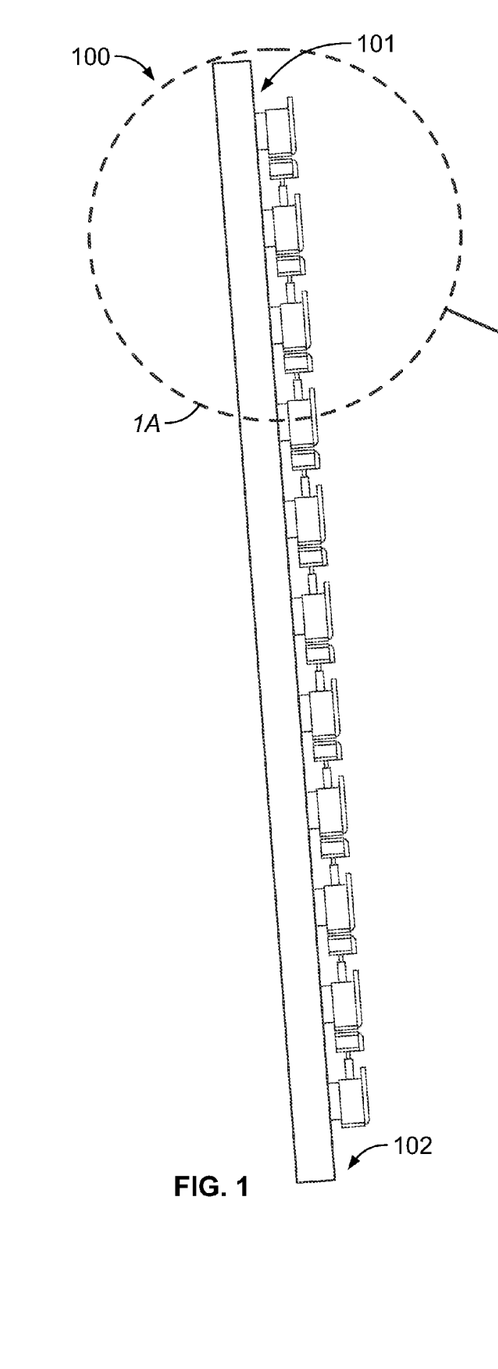
FIG. 1 is a diagrammatic representation of a side view of a jig apparatus according to one embodiment of the disclosure.
Figure 1A:
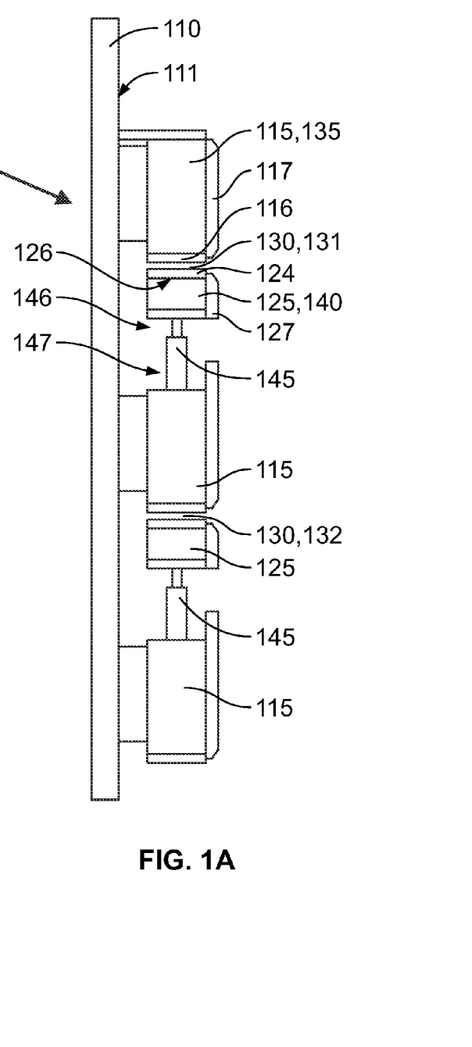
FIG. 1A is a diagrammatic representation showing a detail side view of the jig apparatus of FIG. 1.
Figure 2:
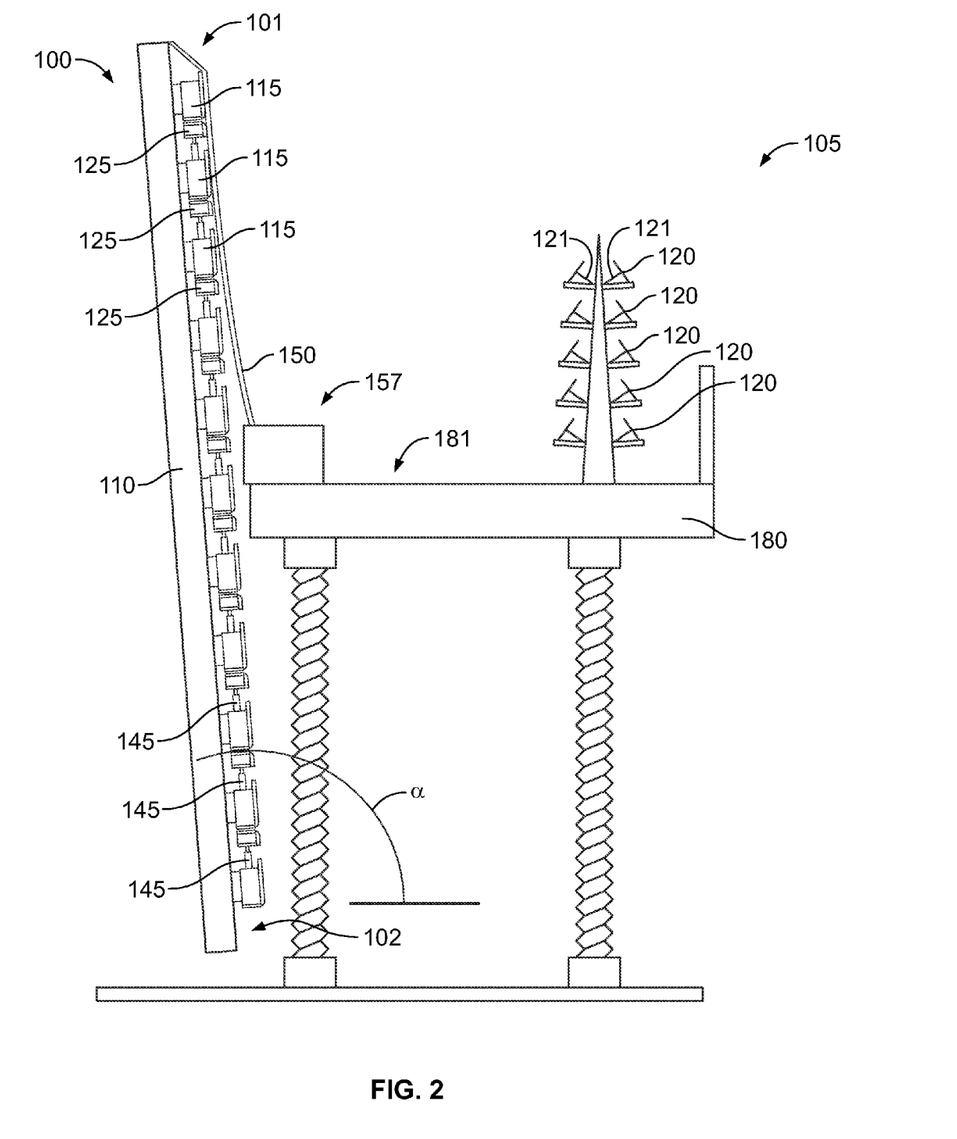
FIG. 2 is a diagrammatic representation of an assembly system including the jig apparatus of FIG. 1, as well as, a bag treatment, a platform, and a cavitation tool.
Figure 3A:
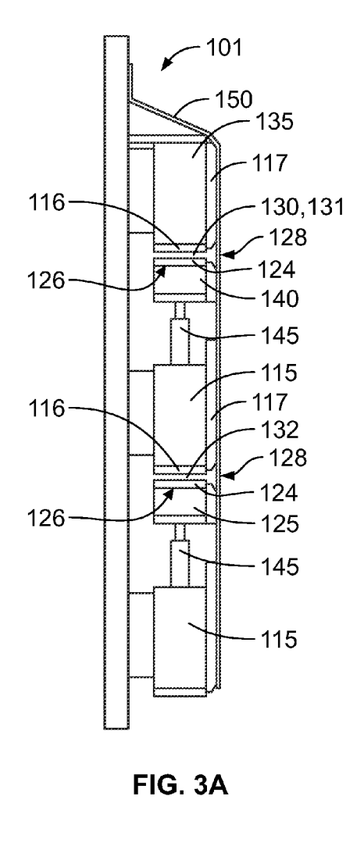
FIG. 3A is a diagrammatic representation of a side view of the assembly system of FIG. 2 in which clamping blocks are in the open position.
Figure 3B:
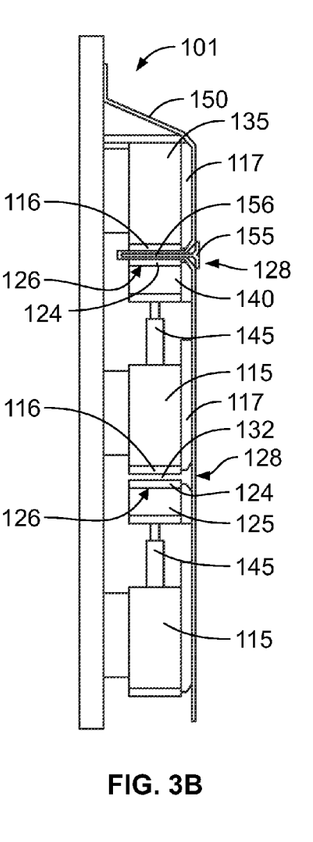
FIG. 3B is a diagrammatic representation of a side view of the assembly system of FIG. 2 with the cavitation tool pressed against the bag treatment and into the first channel of the jig apparatus.
Figure 3C:
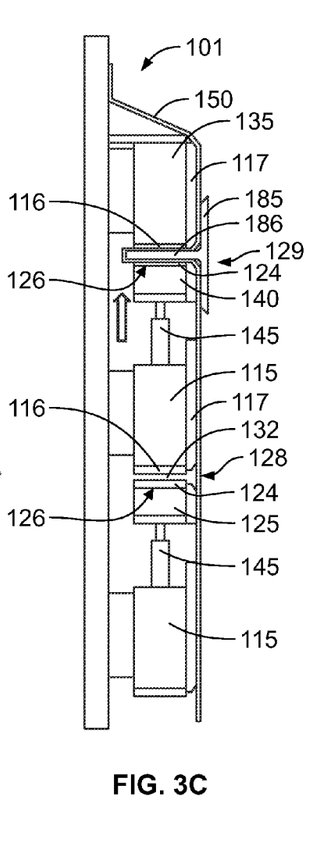
FIG. 3C is a diagrammatic representation of a side view of the assembly system of FIG. 2 in which the cavitation tool has been removed, leaving the bag treatment in the first channel, and a first stiffener is shown pressed into the first channel with the first clamping block in the clamped position.
Figure 3D:
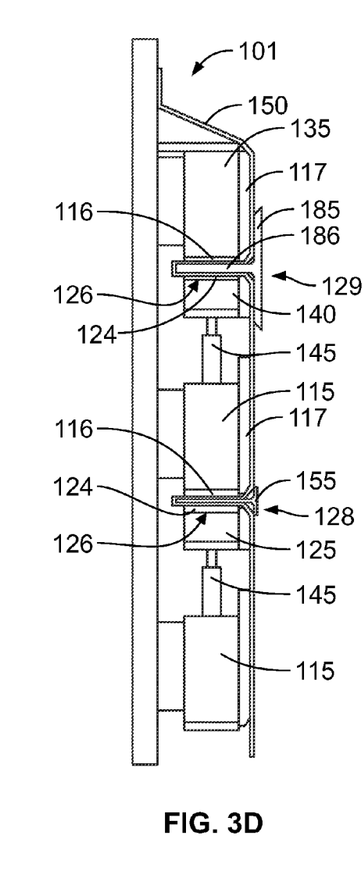
FIG. 3D is a diagrammatic representation of a side view of the assembly system of FIG. 2 with the cavitation tool pressed against the bag treatment and into the second channel of the jig apparatus.
Figure 3E:
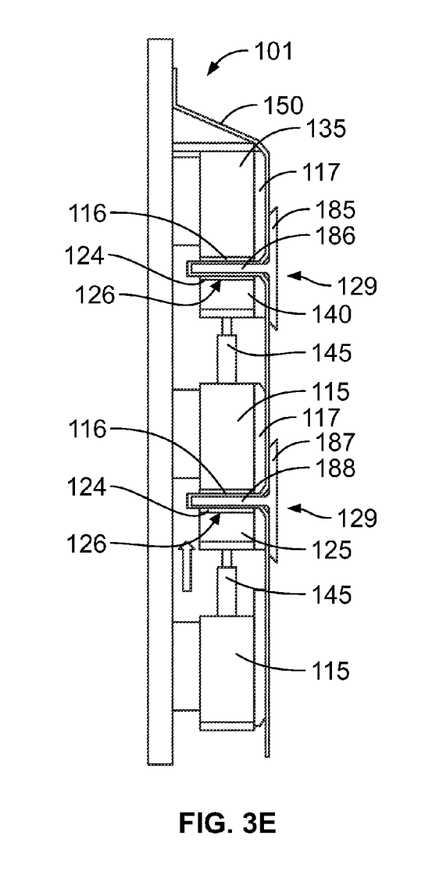
FIG. 3E is a diagrammatic representation of a side view of the assembly system of FIG. 2 in which the cavitation tool has been removed leaving the bag treatment in the second channel and a second stiffener is shown pressed into the second channel with the second clamping block in the clamped position.

Starting with reference to FIGS. 1 and 1A, an exemplary embodiment of the present disclosure is described in detail using, for example, a jig apparatus 100 as part of assembly system 105 (see FIG. 2). A jig apparatus 100 has a first end 101 and a second end 102 and includes a frame 110 with a working surface 111. The frame 110 is preferably made of a lightweight material, such as aluminum, though heavier materials like steel may be used as well. The working surface 111 of the frame 110 is preferably planar, though other contours or angles are contemplated to accommodate desired orientations of stiffeners 120 on a composite wing skin 170 (see FIG. 6).

The jig apparatus 100 includes a plurality of indexing blocks 115 coupled to the working surface 111 of the frame 110. Each of the plurality of indexing blocks 115 has a first indexing surface 116 oriented perpendicular to the working surface 111 of the frame 110 and a second indexing surface 117 oriented parallel to the working surface 111 of the frame 110. In operation, these surfaces 116, 117 mate with corresponding surfaces a plurality of stiffeners 120 thereby aiding with alignment of the stiffeners 120 with respect to the jig apparatus 100. The second indexing surfaces 117 may also aid with indexing and alignment of the stiffener-bag-treatment assembly 163 (see FIG. 4A) with a wing skin 170. In one embodiment, the first indexing surface 116 and the second indexing surface 117 may be coupled to a material having a lower durometer than the material of the frame 110 but still hard enough to substantially retain its shape, such as nylon or rubber, to avoid damaging the composite wing skin 170 or stiffeners 120 during assembly. As shown in FIGS. 1-6, the indexing blocks 115 may have a spaced apart arrangement relative to each other and may extend between the first end 101 and the second end 102 of the jig apparatus 100.

The jig apparatus 100 also includes a plurality of clamping blocks 125 each moveably coupled to one of the plurality of indexing blocks 115. Each of the plurality of clamping blocks 125 has a clamping surface 126 oriented perpendicular to the working surface 111 of the frame 110 and in facing relation to the first indexing surface 116 of an adjacent indexing block 115 thereby defining a plurality of channels 130. In one embodiment, the clamping surface 126 of each of the clamping blocks 125 may be coupled to a firm material 124 capable of slight deformation, such as a high density foam, to slightly conform to and accommodate a stiffener 120 (see FIG. 4A) during assembly, as described below. Each of the clamping blocks 125 may have an indexing surface 127 oriented parallel to the working surface 111 of the frame 110. In one embodiment, the indexing surface 127 of each of the clamping blocks 125 may be coupled to a material having a lower durometer than the material of the frame 110 but still hard enough to substantially retain its shape, such as nylon or rubber, to avoid damaging the composite wing skin or stiffeners 120 during assembly. The indexing surfaces 127 may also aid with indexing and alignment of the stiffener-bag-treatment assembly 163 (see FIG. 4A) with a wing skin 170 (see FIG. 4B). Each of the clamping blocks 125 may have an open position 128 (see FIG. 3A) and a clamped position 129 (see FIG. 3C). In the clamped position 129, the clamping surface 126 of a respective clamping block 125 may be located closer to the first indexing surface 116 of the adjacent indexing block 115 than in the open position 128. In operation, the open position 128 may be sized to receive a portion of a bag treatment 150 (see FIG. 3B) and a protrusion 156 (see FIG. 3B) of a cavitation tool 155 (see FIG. 3B) or an extension 121 of one of the stiffeners 120, discussed below. In one embodiment, the jig apparatus 100 may further include a plurality of actuators 145 each having a first end 146 and a second end 147. The first end 146 of each of the actuators 145 may be coupled to one of the plurality of clamping blocks 125, while the second end 147 of each of the actuators 145 may be coupled to one of the plurality of indexing blocks 115. In the embodiment shown in FIGS. 1-6, each of the indexing blocks 115, except the first indexing block 135, is coupled to one of the clamping blocks 125 by an actuator 145. The actuators 145 may be individually or collectively operated to move the clamping blocks 125 between the open position 128 and the clamped position 129. During placement of the stiffeners, the actuators 145 are preferably activated individually to move into the clamped position 129 and lock each respective stiffener 120 in a separate channel 130. After adhesion of the stiffener-bag-treatment-assembly 163 to the wing skin 170, discussed in more detail below, the actuators are preferably collectively activated to move into the open position 128 to aid in decoupling the jig apparatus 100 from the wing skin support surface 171 (see FIG. 4B). Though the actuators 145 could be moved back into the open position 128 individually.

Figure 4A:
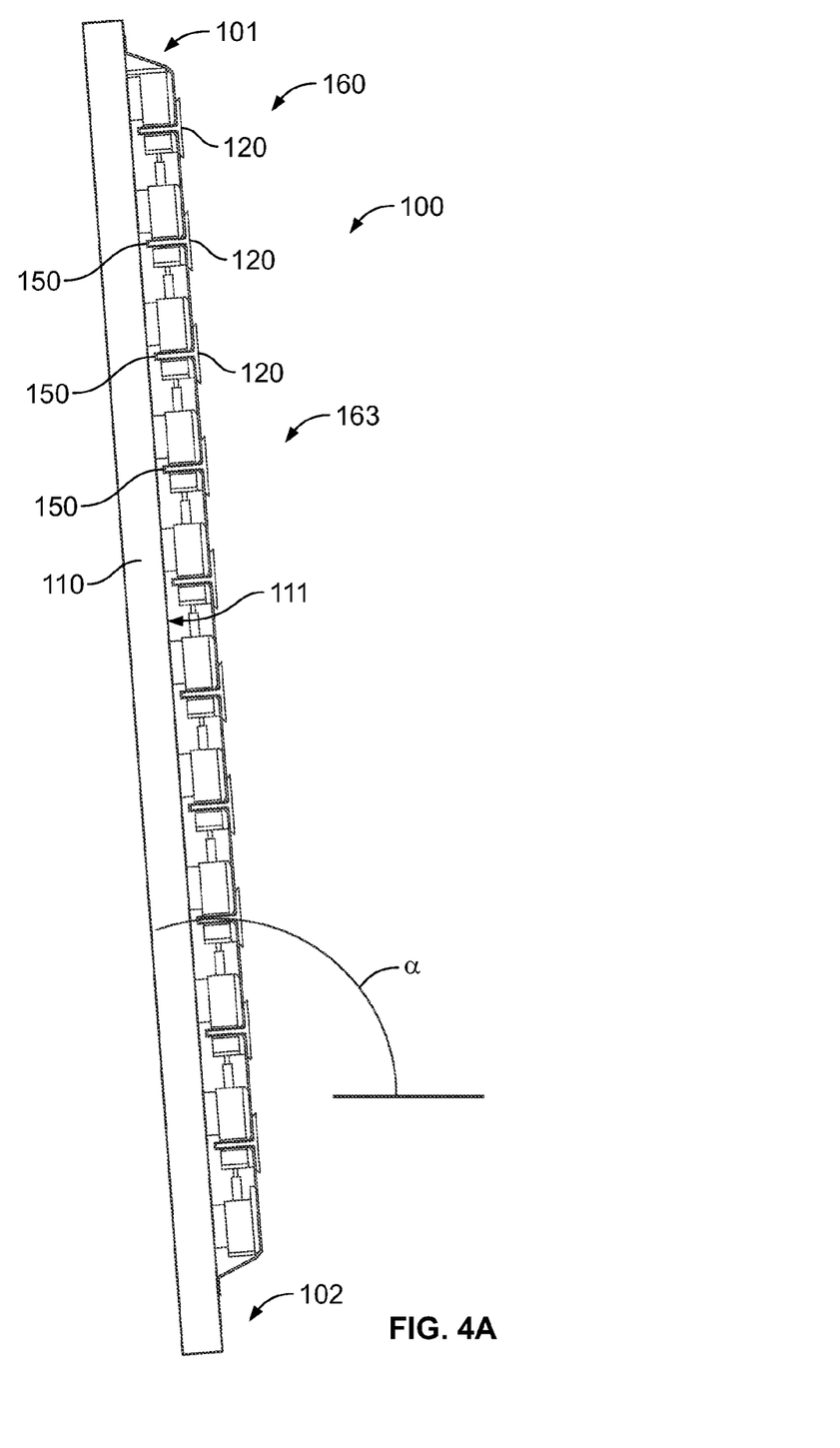
FIG. 4A is a diagrammatic representation of a side view of the assembly system of FIG. 2 with the jig apparatus in a first position, where the bag treatment and a plurality of stiffeners are pressed into the plurality of channels and the bag treatment is clamped at each end of the jig apparatus.
Figure 4B:
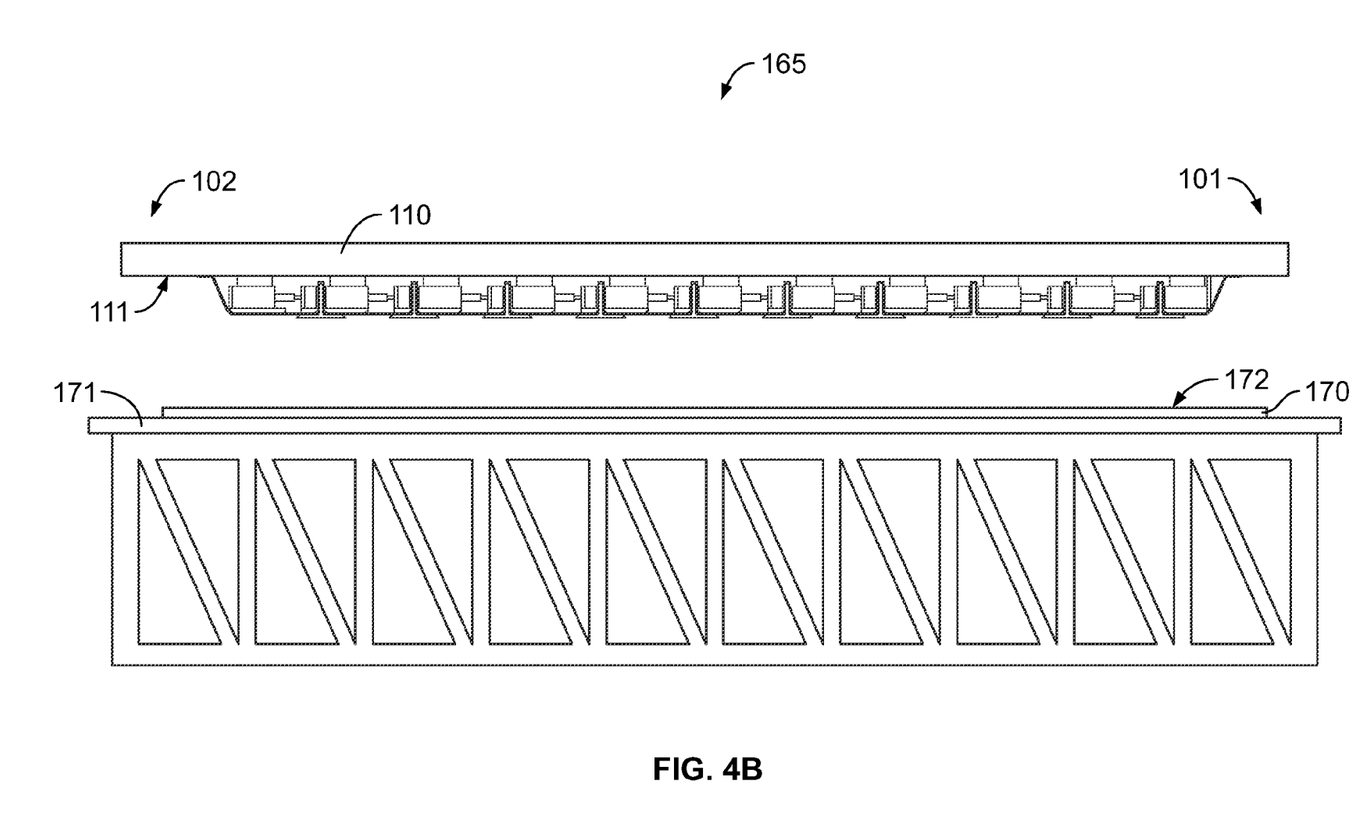
FIG. 4B is a diagrammatic representation of a side view of the assembly system of FIG. 2 with the jig apparatus in a second position for coupling with a wing skin.
Figure 5A:
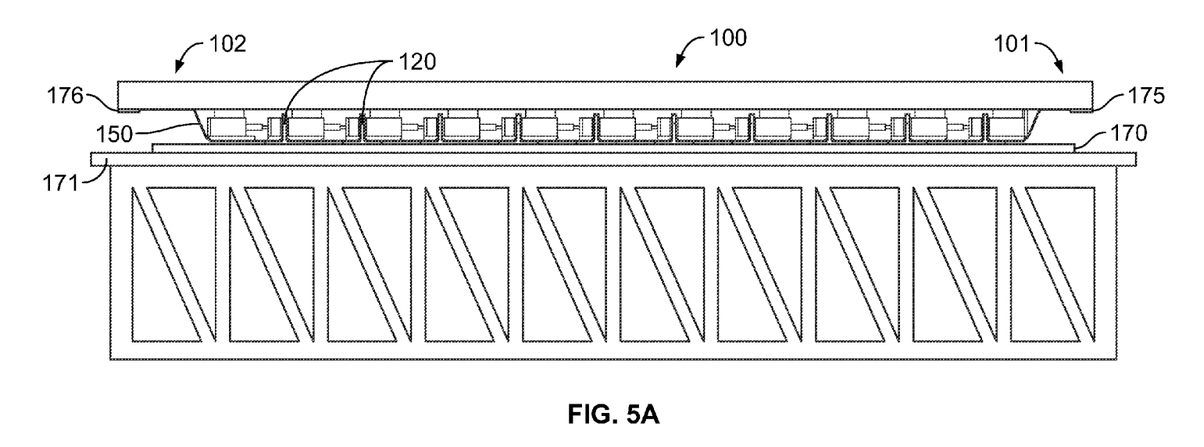
FIG. 5A is a diagrammatic representation of a side view of the assembly system of FIG. 2 with the jig apparatus pressed against a wing skin with a bag treatment coupled to both ends of the jig apparatus.
Figure 5B:
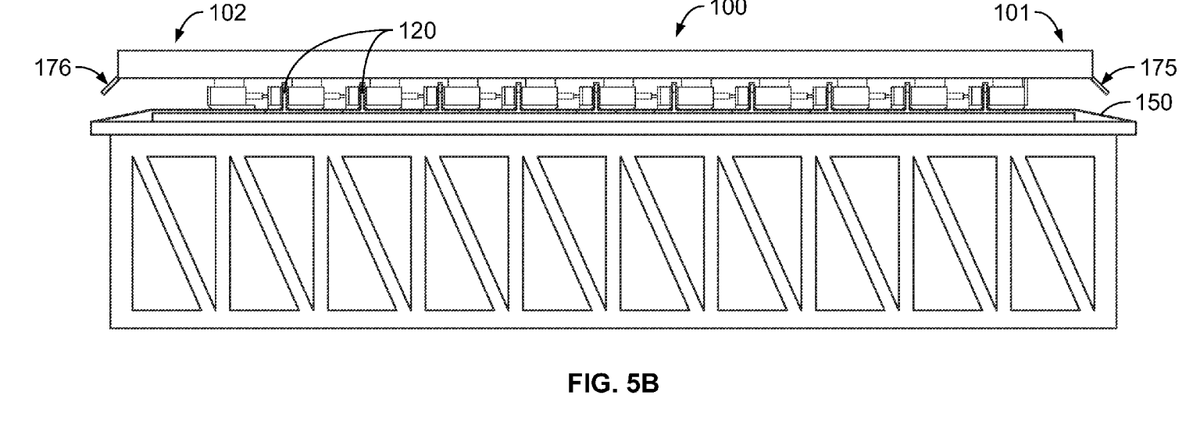
FIG. 5B is a diagrammatic representation of a side view of the assembly system of FIG. 2 with the bag treatment uncoupled from the jig apparatus and sealed around the wing skin such that a vacuum may be applied.

As shown in FIGS. 4A and 4B, the jig apparatus 100 may be moveable between a first position 160 and a second position 165. In the first position 160, the working surface 111 of the frame 110 may be oriented about 90 degrees to about 135 degrees ($\alpha$) relative to a surface supporting the jig apparatus 100, such as the ground or floor of an assembly plant. This angled vertical orientation of the jig apparatus 100 may have several advantages. For example, the angle may help prevent a respective stiffener 120 or a cavitation tool 155 from slipping out of a channel 130 prior to the clamping block 125 moving into the clamped position 129. Also, as discussed below with respect to the assembly system 105 and method, this orientation permits a platform to move from channel to channel to place stiffeners 120 starting at the top of the jig apparatus 100 and positioning the platform 180 (see FIG. 2) so that a worker may operate in an ergonomically friendly environment. In addition, this orientation may permit the bag treatment 150 to hang and be pulled against the jig apparatus 100 by gravity. In the second position 165, the working surface 111 of the frame 110 may be parallel to and in facing relation with the surface 171 supporting the wing skin 170.

In another embodiment, a first clamp 175 (see FIG. 5A) may be coupled to a first end 101 of the jig apparatus 100, and a second clamp 176 (see FIG. 5A) may be coupled to a second end 102 of the jig apparatus 100. These first clamps 175 may hold the bag treatment 150 (see FIG. 5A) in place during assembly of the stiffeners 120 along the length of the jig apparatus 100. This arrangement may allow the second end of the bag treatment 150 to hang freely as the stiffeners 120 are placed against the bag treatment 150 and pressed into the plurality of channels 130 (see FIG. 1A).

Referring to FIG. 2, an assembly system 105 for forming a composite wing skin 170 is shown. The assembly system 105 includes a jig apparatus 100 according to any of the foregoing embodiments. As shown in FIGS. 4A and 4B, the jig apparatus 100 is moveable between a first position 160 and a second position 165. This may be effected via hydraulics, pneumatics or a moveable mechanical support. In alternative embodiments, an overhead crane or a trunion may be utilized to turn and position the jig apparatus 100 on the top surface 172 of the wing skin 170. In the first position 160, the working surface 111 of the frame 110 may be oriented about 90 degrees to about 135 degrees ($\alpha$) relative to a top surface 181 of the platform 180 (see FIG. 2). In the second position 165, the working surface 111 of the frame 110 is parallel to and in facing relation with a surface 171 supporting the composite wing skin 170. This second position 165 enables alignment of the stiffeners 120 and bag treatment 150 with the wing skin 170 in a more efficient, less time consuming and ergonomic manner without the same risk of damage present in known manufacturing systems and methods.

The assembly system 105 also includes a platform 180 moveable between the first end 101 and the second end 102 of the jig apparatus 100. The platform 180 may be raised and lowered using hydraulic or pneumatic lifts or any other known lifting mechanism. The platform 180 is configured to hold at least one operator and a plurality of stiffeners 120 for placement in the jig apparatus 100. A roll or folded section 157 of the bag treatment 150, including an unclamped second end of the bag treatment 150, may be carried on the platform 180. As the platform 180 moves toward the second end 102 of the jig apparatus 100, the bag treatment 150 may be unrolled.

The assembly system 105 further includes a bag treatment 150 coupled to at least the first end 101 of the jig apparatus 100 such that the bag treatment 150 lies adjacent to one or more of the second indexing surfaces 117 of the plurality of indexing blocks 115. In a further embodiment, the bag treatment 150 may include a layer of bag material, a layer of breather material and a layer of release film. The bag material is preferably composed of nylon, however, other known membranes suitable to vacuum forming can be used, such as, silicone, or polyvinyl alcohol based films. In operation, the layer of release film may be arranged in facing relation to the working surface 111 of the frame 110. Preferably, the release film used in the assembly system of this disclosure is of a composition that is acceptable to be used in contact with uncured pre-preg material and provides one or more non-sticky or low tack surfaces. For example, such a release film is preferably composed of fluorinated ethylene-propylene (FEP) and selected so as not to adversely affect the resin content and/or resin-to-fiber ratio of the composite wing skin used in the method. Other types of release films may be used, including, but not limited to, polytetrafluoroethylene (PTFE), ethylene tetrafluoroethylene (ETFE), Polyvinyl Fluoride (PVF) and TOOLTEC® (reinforced PTFE coated fiberglass with adhesive).

In addition, the assembly system 105 includes a cavitation tool 155. This cavitation tool 155 has a protrusion 156 configured to be received within each of the plurality of channels 130. The protrusion 156 of the cavitation tool 155 preferably has a profile that is substantially the same as the extension 121 of at least one of the plurality of stiffeners 120. The cavitation tool 155 is also preferably made of a plastic form in the shape of a stiffener 120 with smooth surfaces to avoid puncturing or damaging the bag treatment 150. The cavitation tool 155 also preferably has a hand grip opposite the protrusion 156 to allow the operator to press the protrusion 156 into a channel 130 and subsequently remove the protrusion 156 from the channel 130.

The assembly system 105 may further include a plurality of stiffeners 120 that each have an extension 121. An airplane wing stiffener 120 may include stringers or other primary or secondary structures, for example, Z-shaped beams, I-beams, hat-stiffeners, C-channels, J-stiffeners, blade-stiffeners, floor-beams, ribs, frames, or spars. Each of these stiffeners 120 contains an extension 121 or segment that may be clamped between a clamping block 125 and an indexing block 115 of the jig apparatus 100.

Turning to FIGS. 3A-E, a method for forming composite wing skin 170 is shown. A jig apparatus 100 is provided according to any of the foregoing embodiments. The jig apparatus 100 includes a first indexing block 135 of the plurality of indexing blocks 115 and a first clamping block 140 of the plurality of clamping blocks 125 that are arranged at a first end 101 of the jig apparatus 100 and define a first channel 131. The method includes coupling a bag treatment 150 to at least the first end 101 of the jig apparatus 100 such that the bag treatment 150 lies adjacent to one or more of the second indexing surfaces 117 of the plurality of indexing blocks 115. Next, a protrusion 156 of a cavitation tool 155 is pressed against the bag treatment 150 and into the first channel 131. The protrusion 156 of the cavitation tool 155 is removed from the first channel 131 such that the bag treatment 150 remains in the first channel 131. The bag treatment 150 may remain in the channel 130 due in part to friction between the bag treatment 150, the first indexing surface 116 and the first clamping surface 126. An extension portion 186 of a first stiffener 185 is then pressed into the first channel 131. The first clamping block 140 moves from an open position 128 to a clamped position 129 thereby locking the first stiffener 185 in place in the first channel 131.

As discussed above, the plurality of indexing blocks 115 may have a spaced apart arrangement relative to each other and may extend between the first end 101 of the jig apparatus 100 and a second end 102 of the jig apparatus 100. Thus, the method may further include repeating the following steps for each of the remaining channels of the plurality of channels 130, starting with a second channel 132 adjacent to the first channel 131 and proceeding in order toward the second end 102 of the jig apparatus. The repeatable steps may include (i) the protrusion 156 of the cavitation tool 155 being pressed against the bag treatment 150 and into a respective remaining channel 132 of the plurality of channels 130, (ii) the protrusion 156 of the cavitation tool 155 being removed from the respective remaining channel 132 such that the bag treatment 150 remains in the respective remaining channel 132, (iii) an extension portion 188 of a respective stiffener 187 of a plurality of stiffeners 120 being pressed into the respective remaining channel 132 and (iv) a respective clamping block 125 defining the respective remaining channel 132 being moved from an open position 128 to a clamped position 129 thereby locking the respective stiffener 187 in place against the respective clamping block 125 in the respective channel 132.

In one embodiment, the first end 101 of the jig apparatus 100 may be arranged above a moveable platform 180 in a vertical orientation. Thus, the method may include moving this platform 180 between the first end 101 of the jig apparatus 100 and the second end 102 of the jig apparatus 100 from channel to channel until a stiffener and a portion of the bag treatment has been clamped in place in each respective channel 132. As discussed above, this may permit a more ergonomic environment for an operator on the platform 180 since the operator can work at chest level, for example.

After the plurality of stiffeners 120 are each pressed into the plurality of channels 130 and the clamping blocks 125 are moved into the clamped position 129, the method may include clamping the bag treatment 150 to the second end 102 of the jig apparatus 100. With the first end and the second end of the bag treatment 150 secured against the jig apparatus 100, the stiffener-bag-treatment assembly 163 may be ready to be placed on the wing skin 170.

In order to effect placement of the stiffener-and-bag-treatment on the wing skin 170, the method may include rotating the jig apparatus 100 from the first position 160 to the second position 165. This may be effected via hydraulics, pneumatics or a moveable mechanical support. Then the plurality of stiffeners 120 may be aligned with target zones on a wing skin 170, via a locating tool. For example, the locating tool may be one or more locating pins coupled to the jig and configured to be received by corresponding channels defined by the surface 171 supporting the wing skin 170 or vice versa. The target zones correspond to predetermined locations for the stiffeners 120 in accordance with the specifications for wing skin 170. A top surface 172 of the wing skin 170 is then placed in contact with the plurality of stiffeners 120 and bag treatment 150.

The method may also include the jig apparatus 100 pressing the plurality of stiffeners 120 and bag treatment 150 against the top surface 172 of the wing skin 170, via the plurality of second indexing surfaces 117 of the plurality of indexing blocks 115 and via a plurality of indexing surfaces 127 of the plurality of clamping blocks 125 both acting under the weight of the jig apparatus 100. This step may occur over a period of time ranging from about 15 minutes to about 30 minutes. During this time, the bag treatment 150 and the plurality of stiffeners 120 may at least partially adhere to the top surface 172 of the wing skin 170. This adhesion may be permitted due to adhesive disposed on at least one of the top surface 172 of the wing skin 170, on the bag treatment 150 or on the bottom surface of the plurality of stiffeners 120.

Figure 6:
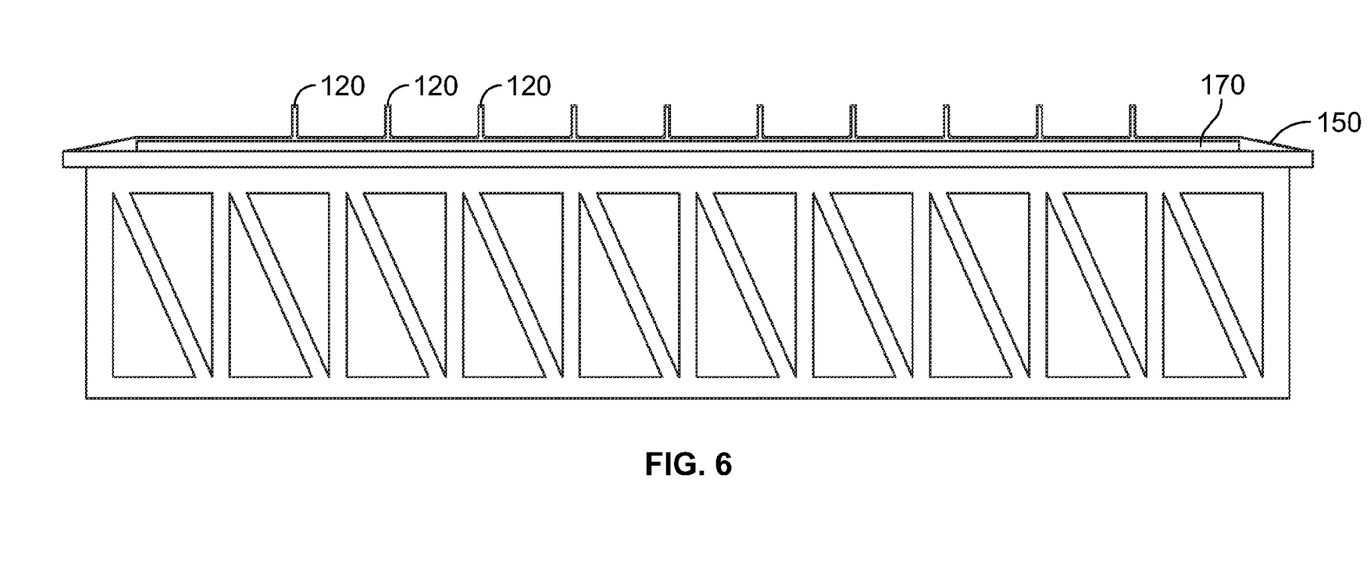
FIG. 6 is a diagrammatic representation of a side view of the bag treatment vacuum sealed to the wing skin and stiffeners with the jig apparatus removed in preparation for autoclave.

The method may further include the bag treatment 150 being unclamped from the jig apparatus 100. The bag treatment 150 may then be sealed around a peripheral edge of the wing skin 170. The seal preferably comprises a butyl rubber or other common vacuum bag sealant tape applied to both the wing skin perimeter and the underside of the bag treatment 150. Alternatively, an elastomer blade seal could be used to provide a reusable and easily releasable seal. The seal holds the edge portions of the bag treatment 150 at or near the perimeter edge of the wing skin 170 in such a manner that when a vacuum is drawn this causes the bag treatment 150 to be drawn downward such that the bag treatment 150 conforms to the top surface 172 of the wing skin 170, to the plurality of stiffeners 120 and to any other primary or secondary structures disposed on the top surface 172 of the wing skin 170 as illustrated in FIG. 6. Next, the plurality of clamping blocks 125 may be moved from the clamped position 129 to the open position 128. A vacuum may then be applied to the bag treatment 150, thereby causing the bag treatment 150 to further conform to the plurality of stiffeners 120 and the top surface 172 of the wing skin 170, for example. In addition, vacuum may be applied to assist with the removal of the jig apparatus 100 from the wing skin 170. In this embodiment, a reduced release-vacuum may be applied operating at 30%, for example, of a full sealing-vacuum. This release-vacuum may enable an operator to manipulate the bag treatment 150, for example, to smooth out any wrinkles or other imperfections, before applying the full sealing-vacuum to the bag treatment 150. The wing skin 170 of FIG. 6 may now be ready for curing in an autoclave, for example.

Although a number of methods can be used to draw a vacuum to cause the forming membrane to conform to the shape of the tool surface, a preferred approach is to operatively couple a vacuum source to the wing skin support surface 171 in a known manner so as to operate the vacuum source and draw or pull a vacuum through channels located on an underside of the base of the wing skin support surface 171. These channels would be in fluid communication with holes or other orifices extending upwards within an area inside a perimeter defined by the seal securing the bag treatment 150 to the wing skin support surface 171. In some circumstances, vacuum can be transported using a nylon tube bag having a breather material inside.

Figure 7:
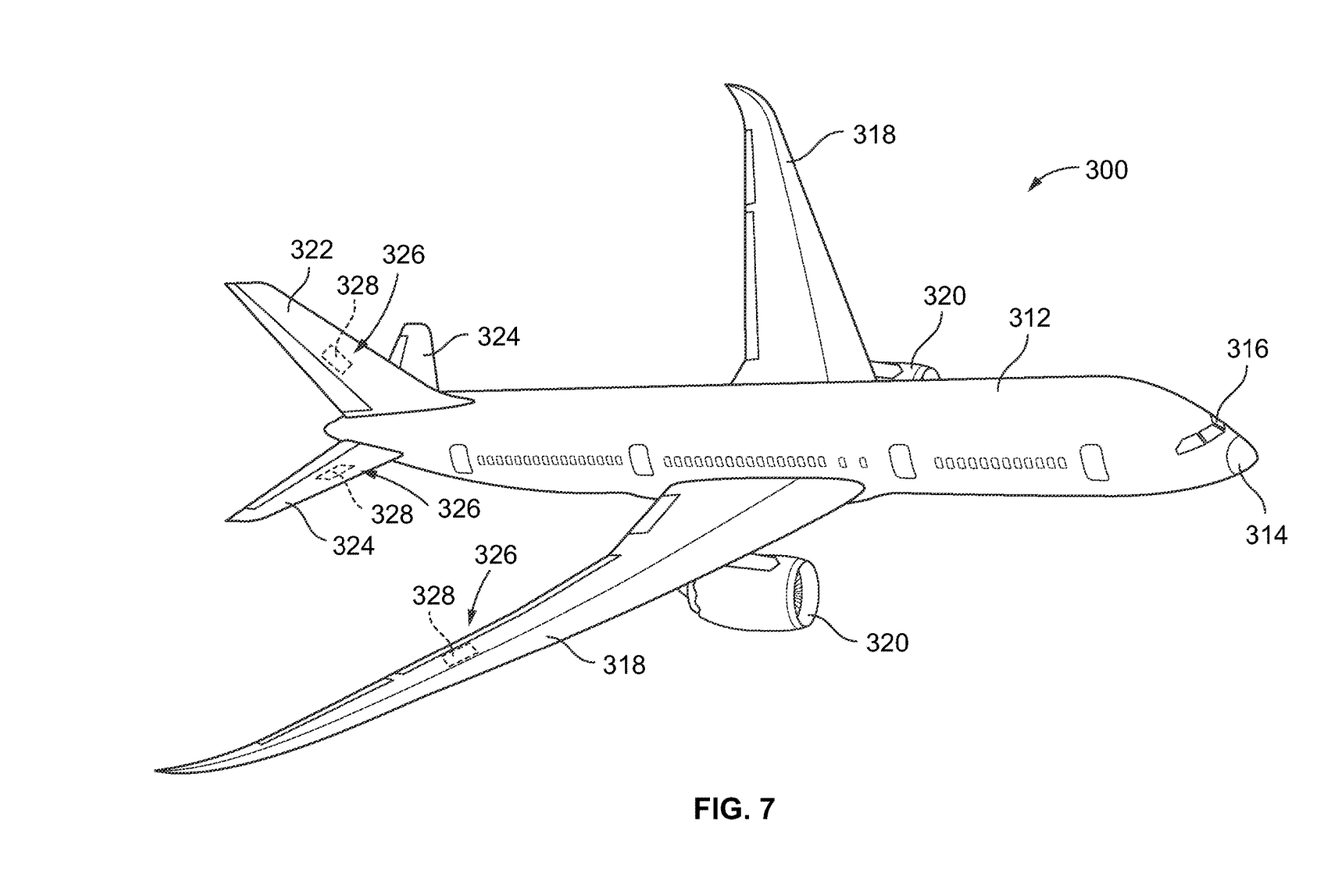
FIG. 7 is a diagrammatic representation of a perspective view of an aircraft that may incorporate one or more composite wing skins manufactured in accordance with one or more embodiments disclosed herein.

FIG. 7 is an illustration of a perspective view of an aircraft 300 that may incorporate one or more composite laminates manufactured by one of the embodiments of the present disclosure. As shown in FIG. 7, the aircraft 300 comprises a fuselage 312, a nose 314, a cockpit 316, wings 318 operatively coupled to the fuselage 312, one or more propulsion units 320, a tail vertical stabilizer 322, and one or more tail horizontal stabilizers 324. Although the aircraft 300 shown in FIG. 7 is generally representative of a commercial passenger aircraft, the one or more composite laminates, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 8:
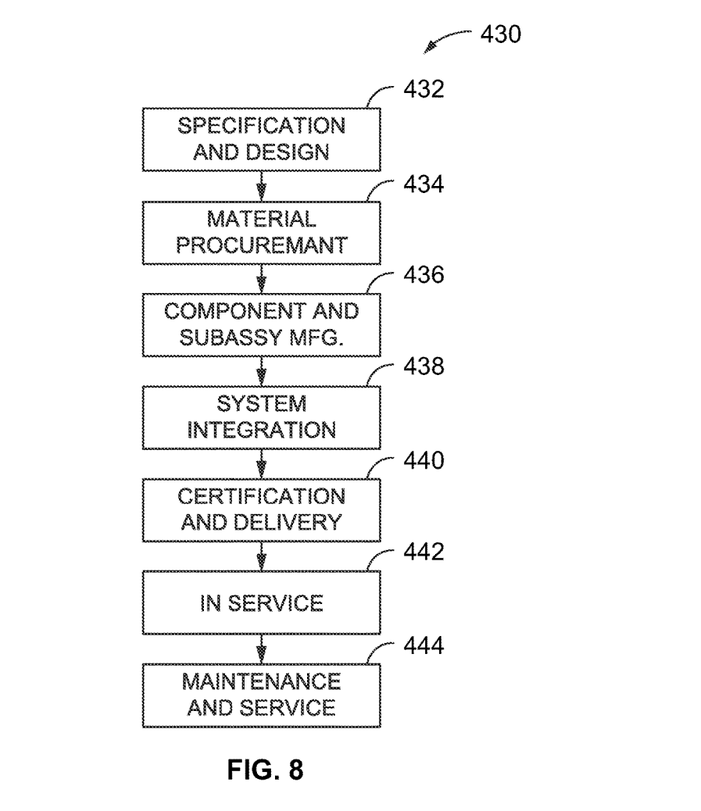
FIG. 8 is a flow diagram of an embodiment of an aircraft production and service method of the disclosure.
Figure 9:
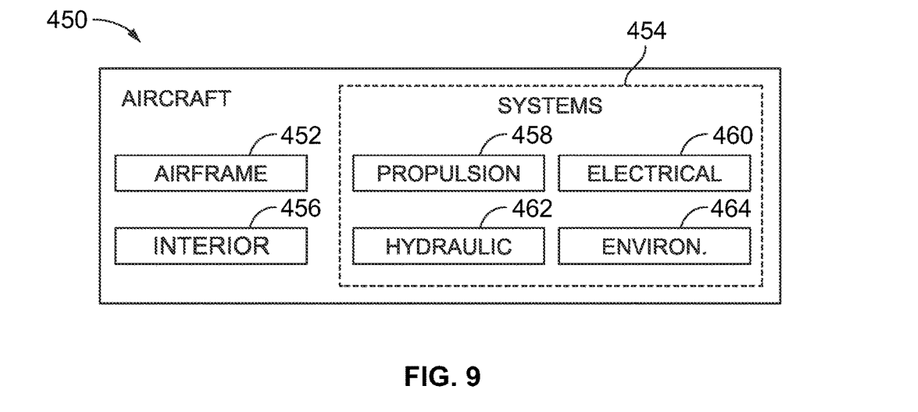
FIG. 9 is a functional block diagram of an aircraft.

Embodiments of the disclosure may find use in a variety of potential applications, particularly in the transportation industry, including for example, aerospace, marine, automotive applications and other application where thermoplastic composite tubular structures may be used. Therefore, referring now to FIGS. 8 and 9, embodiments of the disclosure may be used in the context of an aircraft manufacturing and service method 430 as shown in FIG. 8 and an aircraft 450 as shown in FIG. 9. Aircraft applications of the disclosed embodiments may include, for example, without limitation, the design and fabrication of composite laminates fabricated by way of the lay-up methods and systems as disclosed herein.

During pre-production, exemplary method 430 may include specification and design 432 of the aircraft 450 and material procurement 434. As just one example, for the specification and design of the aircraft-related composite wing skins formed using the jig apparatus, systems and methods disclosed herein, may be determined at this step. As just one example, at this step, it may be determined that specific stiffeners and arrangements for the composite wing skin 170 are needed requiring the jig apparatus 100.

During production, component and subassembly manufacturing 436 and system integration 438 of the aircraft 450 takes place. As explained in greater detail above, FIGS. 1-6 illustrate one preferred type of process steps for forming composite wing skin utilizing a stiffener-bag-treatment assembly in accordance with one aspect of the present disclosure. After such a component and subassembly manufacturing step, the aircraft 450 may go through certification and delivery 440 in order to be placed in service 442. While in service by a customer, the aircraft 450 is scheduled for routine maintenance and service 444, which may also include modification, reconfiguration, refurbishment, and so on.

Each of the process steps of exemplary method 430 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 450 produced by exemplary method 430 may include an airframe 452 with a plurality of high-level systems 454 and an interior 456. Examples of high-level systems 454 may include one or more of a propulsion system 458, an electrical system 460, a hydraulic system 462, and an environmental system 464. Any number of other systems may be included. Although an aerospace example is shown, the principles of the disclosure may be applied to other industries, such as the marine and automotive industries.

Apparatus, systems and methods embodied herein may be employed during any one or more of the stages of the aircraft manufacturing and service method 430. For example, components or subassemblies corresponding to production process may be fabricated or manufactured in a manner similar to components or subassemblies produced while the aircraft 450 is in service. Also, one or more apparatus embodiments, method embodiments, or a combination thereof may be utilized during the production stages 432 and 434, for example, by substantially expediting assembly of or reducing the cost of an aircraft 450. Similarly, one or more of apparatus embodiments, method embodiments, or a combination thereof may be utilized while the aircraft 450 is in service, for example and without limitation, to maintenance and service 444.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. A jig apparatus for forming a composite wing skin, the jig apparatus comprising:
   a frame with a working surface;
   a plurality of indexing blocks coupled to the working surface of the frame, wherein each of the plurality of indexing blocks has a first indexing surface on a first lateral side and oriented perpendicular to the working surface of the frame and a second indexing surface on a top side and oriented parallel to the working surface of the frame; and
   a plurality of clamping blocks each moveably coupled to a second lateral side of the plurality of indexing blocks, wherein each of the plurality of clamping blocks has a clamping surface oriented perpendicular to the working surface of the frame and in facing relation to the first indexing surface of an adjacent indexing block thereby defining a plurality of channels.

2. The jig apparatus of claim 1, further comprising:
   a plurality of actuators each having a first end and a second end, wherein the first end of each of the plurality of actuators is coupled to one of the plurality of clamping blocks, wherein the second end of each of the plurality of actuators is coupled to one of the plurality of indexing blocks.

3. The jig apparatus of claim 1, wherein nylon is coupled to the first indexing surface and the second indexing surface of each of the plurality of indexing blocks, and wherein a high density foam is coupled to the clamping surface of each of the plurality of clamping blocks.

4. The jig apparatus of claim 1, wherein each of the plurality of clamping blocks has an open position and a clamped position, wherein in the clamped position the clamping surface of a respective clamping block is located closer to the first indexing surface of the adjacent indexing block than in the open position.

5. The jig apparatus of claim 1, wherein the plurality of indexing blocks have a spaced apart arrangement relative to each other and extend between a first end of the jig and a second end of the jig.

6. The jig apparatus of claim 1, wherein the jig is moveable between a first position and a second position, wherein in the first position the working surface of the frame is oriented about 90 degrees to about 135 degrees relative to a surface supporting the jig, and wherein in the second position the working surface of the frame is approximately parallel to and in facing relation with the surface supporting the jig.

7. The jig apparatus of claim 1, further comprising:
   a first clamp coupled to a first end of the jig; and
   a second clamp coupled to a second end of the jig.

8. The jig apparatus of claim 1, wherein each of the plurality of clamping blocks has an indexing surface oriented parallel to the working surface of the frame.

9. The jig apparatus of claim 8, wherein nylon is coupled to the indexing surface of each of the plurality of clamping blocks.

10. An assembly system for forming composite wing skin, the system comprising:
    a jig apparatus comprising (i) a frame with a working surface, (ii) a plurality of indexing blocks coupled to the working surface of the frame, wherein each of the plurality of indexing blocks has a first indexing surface on a first lateral side and oriented perpendicular to the working surface of the frame and a second indexing surface on a top side and oriented parallel to the working surface of the frame and (iii) a plurality of clamping blocks each moveably coupled to a second lateral side of the plurality of indexing blocks, wherein each of the plurality of clamping blocks has a clamping surface oriented perpendicular to the working surface of the frame and in facing relation to the first indexing surface of an adjacent indexing block thereby defining a plurality of channels;
a platform moveable between a first end of the jig apparatus and a second end of the jig apparatus;
a bag treatment coupled to at least the first end of the jig apparatus such that the bag treatment lies adjacent to one or more of the second indexing surfaces of the plurality of indexing blocks; and
a cavitation tool having a protrusion configured to be received within each of the plurality of channels.

11. The assembly system of claim 10, further comprising: a plurality of stiffeners that each have an extension.

12. The assembly system of claim 11, wherein the protrusion of the cavitation tool has a profile that is substantially the same as the extension of at least one of the plurality of stiffeners.

13. The assembly system of claim 10, wherein the bag treatment comprises a layer of nylon bag material, a layer of breather material and a layer of release film, and wherein the layer of release film is arranged in facing relation to the working surface of the frame.

14. The assembly system of claim 10, wherein the jig apparatus is moveable between a first position and a second position, wherein in the first position the working surface of the frame is oriented about 90 degrees to about 135 degrees relative to a top surface of the platform, and wherein in the second position the working surface of the frame is approximately parallel to and in facing relation with a surface supporting the jig apparatus.

15. A method for forming a composite wing skin, the method comprising:
providing a jig apparatus comprising (i) a frame with a working surface, (ii) a plurality of indexing blocks coupled to the working surface of the frame, wherein each of the plurality of indexing blocks has a first indexing surface on a first lateral side and oriented perpendicular to the working surface of the frame and a second indexing surface on a top side and oriented parallel to the working surface of the frame and (iii) a plurality of clamping blocks each moveably coupled to a second lateral side of the plurality of indexing blocks, wherein each of the plurality of clamping blocks has a clamping surface oriented perpendicular to the working surface of the frame and in facing relation to the first indexing surface of an adjacent indexing block thereby defining a plurality of channels, wherein a first indexing block of the plurality of indexing blocks and a first clamping block of the plurality of clamping blocks are arranged at a first end of the jig apparatus and define a first channel;
clamping a bag treatment to at least the first end of the jig apparatus such that the bag treatment lies adjacent to one or more of the second indexing surfaces of the plurality of indexing blocks;
pressing a protrusion of a cavitation tool against the bag treatment and into the first channel;
removing the protrusion of the cavitation tool from the first channel such that the bag treatment remains in the first channel;
pressing an extension portion of a first stiffener into the first channel; and
moving the first clamping block from an open position to a clamped position thereby locking the first stiffener in place in the first channel.

16. The method of claim 15, wherein the plurality of indexing blocks have a spaced apart arrangement relative to each other and extend between the first end of the jig apparatus and a second end of the jig apparatus, and
repeating the following steps for each of the remaining channels of the plurality of channels, starting with a second channel adjacent to the first channel and proceeding in order toward the second end of the jig apparatus:
pressing the protrusion of the cavitation tool against the bag treatment and into a respective remaining channel of the plurality of channels;
removing the protrusion of the cavitation tool from the respective remaining channel such that the bag treatment remains in the respective remaining channel;
pressing an extension portion of a respective stiffener of a plurality of stiffeners into the respective remaining channel; and
moving a respective clamping block defining the respective remaining channel from an open position to a clamped position thereby locking the respective stiffener in place against the respective clamping block in the respective remaining channel.

17. The method of claim 15, further comprising moving a platform between the first end of the jig apparatus and a second end of the jig apparatus; and
clamping the bag treatment to the second end of the jig apparatus.

18. The method of claim 16, further comprising:
rotating the jig apparatus from a first position to a second position;
aligning, via a locating tool, the plurality of stiffeners with target zones on a wing skin; and
contacting a top surface of the wing skin with the plurality of stiffeners and bag treatment.

19. The method of claim 18, further comprising:
the jig apparatus pressing the plurality of stiffeners and bag treatment against the top surface of the wing skin, via a plurality of second indexing surfaces of the plurality of indexing blocks and via a plurality of indexing surfaces of the plurality of clamping blocks acting under a weight of the jig apparatus; and
at least partially adhering the bag treatment and the plurality of stiffeners to the top surface of the wing skin.

20. The method of claim 18, further comprising:
unclamping the bag treatment from at least the first end of the jig apparatus;
sealing the bag treatment around a peripheral edge of the wing skin;
moving the plurality of clamping blocks from the clamped position to the open position; and
applying a vacuum to the bag treatment thereby causing the bag treatment to conform to the plurality of stiffeners and the top surface of the wing skin.

* * * * *